United States Patent
Warburton-Pitt

(10) Patent No.: US 6,660,396 B1
(45) Date of Patent: Dec. 9, 2003

(54) MOLDED ENCAPSULATED INDICIA SYSTEM

(75) Inventor: Stephen Warburton-Pitt, Andover, NJ (US)

(73) Assignee: Truseal USA, Inc., Dover, NJ (US)

( * ) Notice: Subject to any disclaimer, the term of this patent is extended or adjusted under 35 U.S.C. 154(b) by 0 days.

(21) Appl. No.: 10/161,341

(22) Filed: Jun. 3, 2002

(51) Int. Cl.[7] .............................. B32B 9/04; B32B 1/08; B32B 31/26
(52) U.S. Cl. .................... 428/447; 428/446; 428/448; 428/34.6; 428/34.7; 428/68; 428/76; 156/306.6; 156/306.9; 156/307.1; 156/307.7
(58) Field of Search .................. 428/446, 447, 428/448, 34.1, 34.6, 34.7, 68, 76, 13; 156/306.6, 306.9, 307.1, 307.7; 264/132; 493/189

(56) References Cited

U.S. PATENT DOCUMENTS 3,927,695 A * 12/1975 Crockwell ............ 138/137
4,989,497 A * 2/1991 Lerma .................. 92/103 SD
5,500,280 A * 3/1996 Yamazaki et al. ........ 428/220
6,252,028 B1 6/2001 Fehn et al.

\* cited by examiner

*Primary Examiner*—Robert Dawson
*Assistant Examiner*—Michael J Feely
(74) *Attorney, Agent, or Firm*—David L. Davis

(57) ABSTRACT

A system for permanently associating identifying indicia with a previously manufactured product. Silicone sheet material having imbedded therein a quantity of thermally activatable crosslinking catalyst is secured to the product. An indici-containing element is placed on the silicone sheet material and is then covered by another piece of the same type of silicone sheet material. Heat is then applied to the assembly to cause the pieces of silicone sheet material to crosslink together and encapsulate the indicia-containing element.

7 Claims, 3 Drawing Sheets

MOLDED ENCAPSULATED INDICIA SYSTEM

BACKGROUND OF THE INVENTION

This invention relates to the permanent association of identifying indicia with a previously manufactured product.

It is often desirable to permanently associate identifying indicia, or data, with a previously manufactured product. Such indicia may be visually sensed, such as a printed identification, or may be machine readable, such as a magnetic strip, an optical or magnetic bar code, or even a semiconductor chip. For example, in the pharmaceutical manufacturing industry, it is often required to specifically identify the sections of silicone tubing which are utilized during different manufacturing steps. If the identification were to be placed on the tubing by temporary means, such as by hang tags, such identification could be lost. It would therefore be desirable to have a system wherein the identifying indicia is permanently associated with the previously manufactured product.

It would also be desirable to have such a system wherein the identifying indicia is encapsulated within a protective layer.

SUMMARY OF THE INVENTION

U.S. Pat. No. 6,252,028 to Fehn et al discloses a composition of silicone having imbedded therein a quantity of thermally activatable crosslinking catalyst. According to the present invention, such a composition is advantageously utilized by providing a supply of silicone sheet material having imbedded therein a quantity of thermally activatable crosslinking catalyst. A first piece of the sheet material is placed on a previously manufactured product. Heat is applied to the first piece sufficient to secure the first piece to the product. An element containing the desired indicia is then placed on the first piece. A second piece of the sheet material is placed in overlying relation to the indicia-containing element, the second piece being of sufficient size to completely cover the element and be in contact with the first piece. Heat is then applied to the first and second pieces sufficient to crosslink together the first and second pieces where they are in contact. This results in the indicia-containing element being encapsulated in silicone and permanently secured to the previously manufactured product.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

For the purposes of simplifying the following discussion, the underlying previously manufactured product will be considered to be a length of silicone tubing of generally cylindrical shape. However, it is understood that the present invention is not intended to be limited to use with only that type of underlying previously manufactured product.

The aforereferenced U.S. Pat. No. 6,252,028 discloses a composition of silicone having imbedded therein a quantity of thermally activatable catalyst. The patented composition exhibits good storage stability at room temperature, but crosslinks rapidly at elevated temperatures above 100° C. This composition is manufacturable in sheet form, which is advantageous for use with the present invention.

Figure 1:
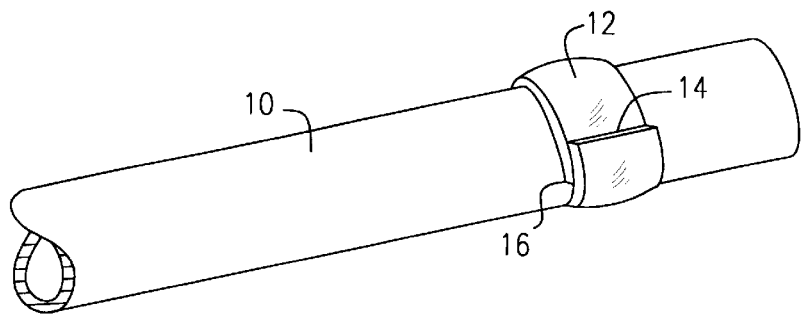
FIGS. 1–3 illustrate steps in the practice of the present invention.
Figure 4:
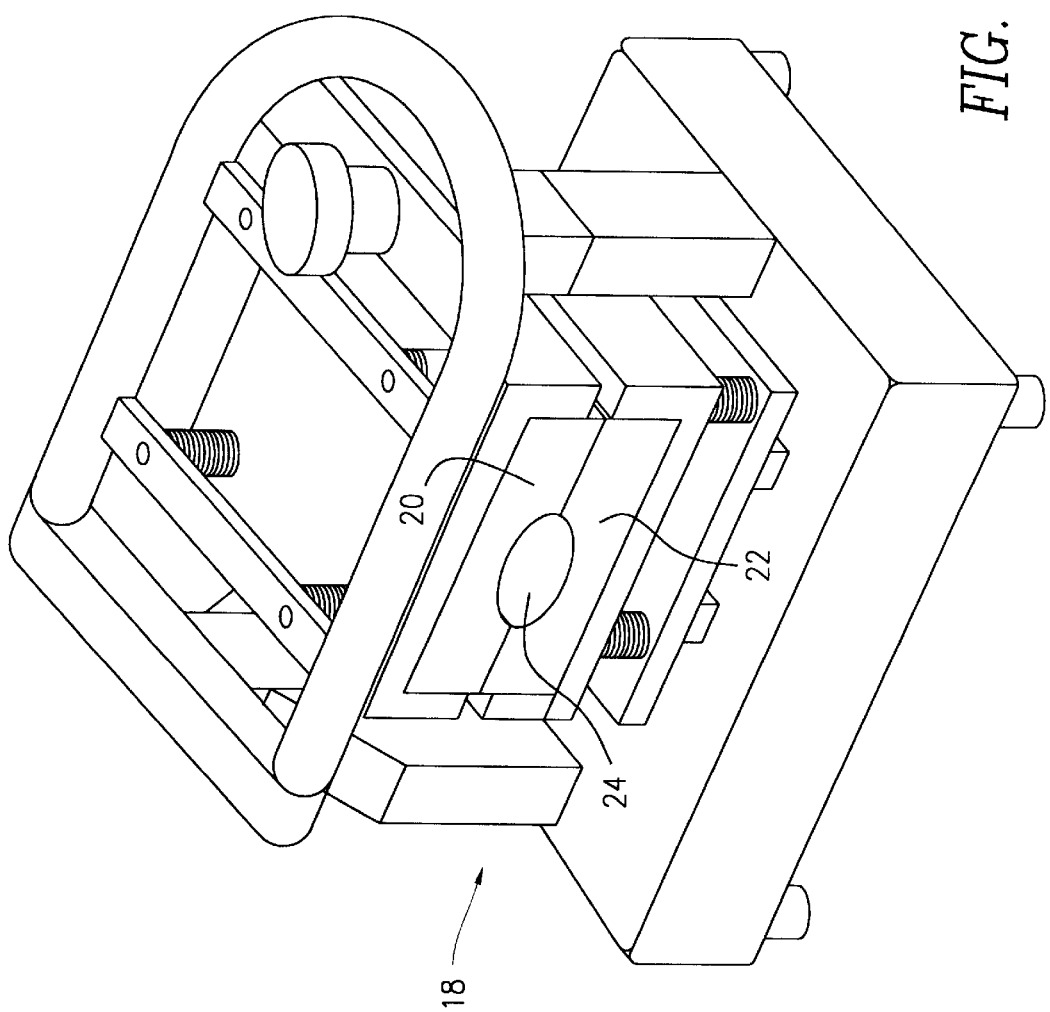
FIGS. 4 and 5 illustrate apparatus useful in practicing the present invention.
Figure 5:
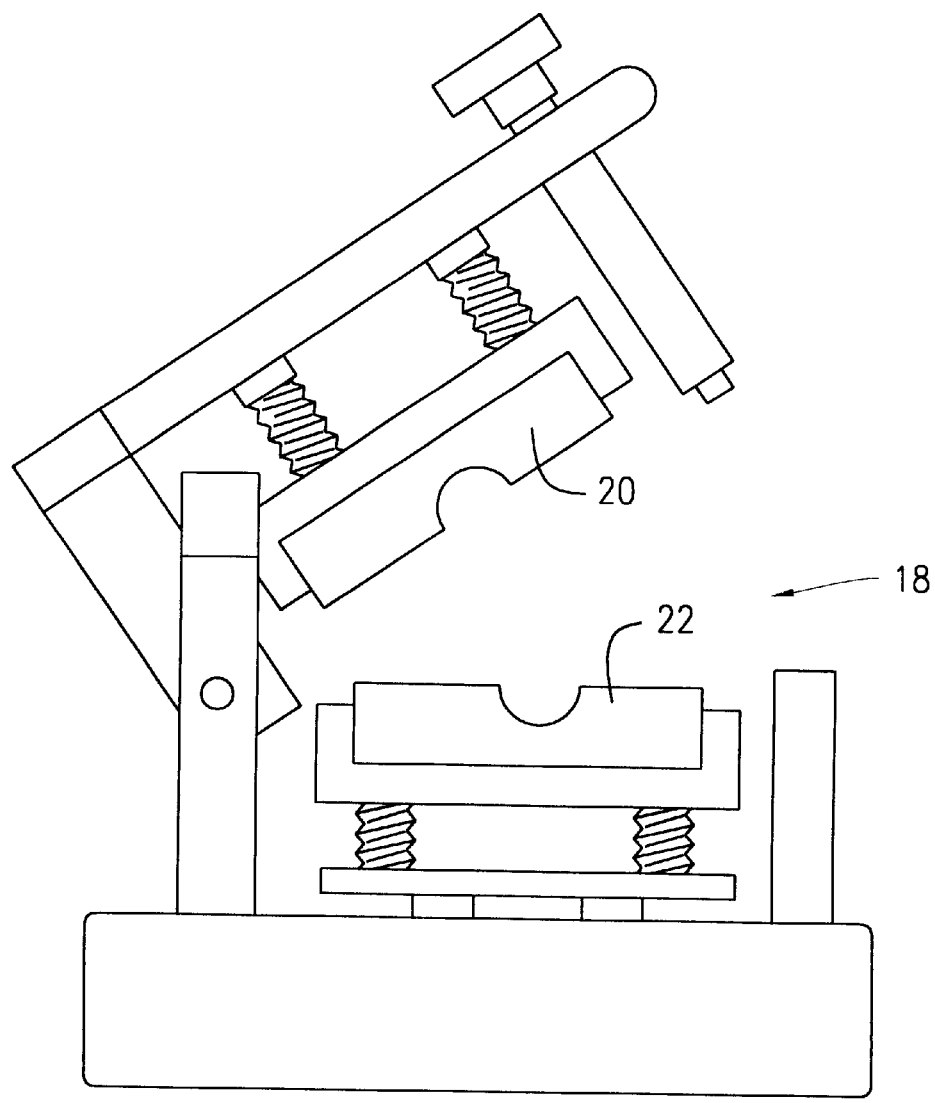

FIG. 1 illustrates a length of previously manufactured silicone tubing 10 around which has been placed a piece 12 of sheet material formed in accordance with the teachings of U.S. Pat. No. 6,252,028. Preferably, the piece 12 is cut from an elongated strip of the sheet material to provide a length which is greater than the outer circumference of the tube 10 so that a first end 14 overlies a second end 16. Thus, the piece 12 is self-overlapping. FIGS. 4 and 5 illustrate a mold apparatus 18 which may be utilized in the practice of the present invention. The mold apparatus 18 includes a pair of heated mold blocks 20, 22 which when placed adjacent each other as shown in FIG. 4 form a mold cavity 24 for accepting therein the tubing 10 with the silicone sheet material wrapped thereabout.

After the tubing 10 has the piece of sheet material 12 wrapped thereabout, as shown in FIG. 1, it is placed in the mold cavity 24, the mold is closed, and heat is applied to the mold blocks 20, 22 (by means not shown) so that the piece of sheet material 12 reaches a temperature wherein the silicone crosslinks both within the piece 12 and to the tubing 10. The piece 12 then becomes unitary with the tubing 10. After a sufficient time for curing to occur, the mold apparatus 18 is opened and the tubing 10 is removed.

Figure 2:
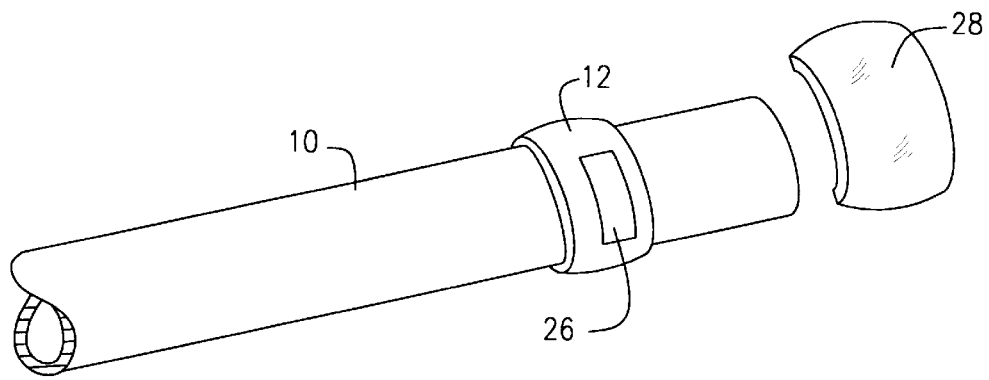
Figure 3:
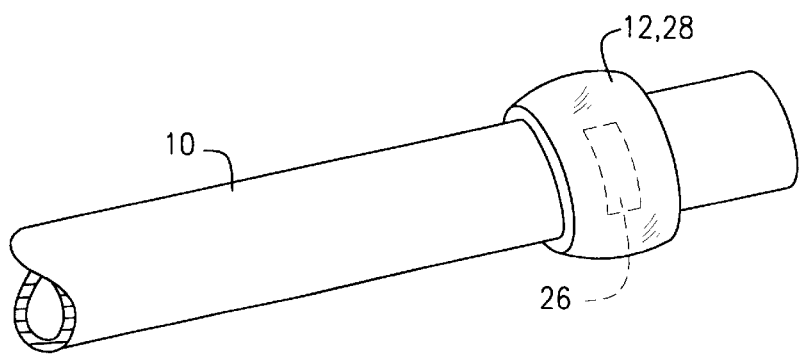

After cooling, an indicia-containing element 26 is placed on the raised piece 12 (FIG. 2). The indicia on the element 26 can take any desired form. For example, it can be a strip of paper or plastic having printed material thereon. Alternatively, it can be a strip of paper or plastic with an optical bar code. It can also be a magnetic bar code strip or a semiconductor chip.

After the element 26 is placed on the piece 12, a second piece 28 of the silicone sheet material is placed in overlying relation to the element 26. The second piece 28 is selected to be of sufficient size so that it completely covers the element 26 and is in contact with the piece 12. Preferably the piece 12 is cut from the elongated strip of silicone sheet material and is of sufficient length that it can be wrapped around the piece 12 and be self-overlapping. The assembly is then placed in the mold cavity 24, the mold is closed, and heat is applied to the mold blocks 20, 22 so that all of the silicone crosslinks to form a unitary structure of the tubing 10 and the pieces 12,28, with the element 26 being encapsulated within the silicone material.

Although the foregoing discussion has utilized the silicone tubing 10 as the underlying previously manufactured product, it will be appreciated that the present invention can be practiced with other than silicone tubing. For example, strips of the silicone sheet material can be wrapped around rigid non-silicone members, such as steel tubing, and placed in a mold apparatus to provide the first layer of silicone.

Further, although the foregoing discussion has disclosed a specific sequence of steps, the process can be implemented by initially forming a sandwich of the pieces 12 and 28 with the element 26 therebetween. The sandwich is then wrapped around the tubing 10 so that its ends abut, The complete assembly is then placed in the mold apparatus 18 and heated so that the silicone becomes crosslinked. Also, when using silicone tubing 10, the piece 12 can be eliminated. In this case, the element 26 is placed on the tubing 10 and the piece 28 is wrapped thereabout. The assembly is then placed in the mold apparatus 18 and heated so that the silicone becomes crosslinked. In all cases, the indicia-containing element is completely encapsulated within a protective layer of silicone.

Accordingly, there has been disclosed a system for permanently associating identifying indicia with a previously manufactured product. While exemplary embodiments of the present invention have been disclosed herein, it will be appreciated that various adaptations and modifications to the disclosed embodiments are possible and it is intended that this invention be limited only by the scope of the appended claims.

What is claimed is:

1. A method for securing an element containing indicia to a base member, comprising the steps of:

providing a supply of silicone sheet material having imbedded therein a quantity of thermally activatable crosslinking catalyst;

placing a first piece of said sheet material on said base member;

applying heat to said first piece sufficient to secure said first piece to said base member;

placing said element on said first piece;

placing a second piece of said sheet material in overlying relation to said element, wherein said second piece is of sufficient size to completely cover said element and be in contact with said first piece; and applying heat to said first and second pieces sufficient to crosslink together said first and second pieces where they are in contact.

2. The method according to claim 1:

wherein said base member has a cylindrical shape; and wherein the step of placing a first piece comprises the step of wrapping said first piece around the cylindrical shape of said base member so that a first end of said first piece overlies a second end of said first piece.

3. The method according to claim 1:

wherein the step of providing a supply of silicone sheet material comprises the step of providing an elongated strip of silicone sheet material having imbedded therein a quantity of thermally activatable crosslinking catalyst; and wherein the step of placing a first piece comprises the steps of:

selecting a length of said strip greater than an outer perimeter of said base member; and wrapping said length of said strip about said outer perimeter so that said length of said strip is self-overlapping.

4. A method for securing an element containing indicia to a base member, comprising the steps of:

providing a supply of silicone sheet material having imbedded therein a quantity of thermally activatable crosslinking catalyst;

forming a sandwich comprising said element between two pieces of said sheet material so that said element is completely covered;

wrapping said sandwich around said base member so that a first end of said sandwich contacts a second end of said sandwich; and applying heat to said sandwich sufficient to crosslink together the two pieces of said silicone sheet material where they are in contact.

5. A method for securing an element containing indicia to a silicone base member, comprising the steps of:

providing a supply of silicone sheet material having imbedded therein a quantity of thermally activatable crosslinking catalyst;

placing said element on said base member;

placing a piece of said sheet material in overlying relation to said element, wherein said piece is of sufficient size to completely cover said element; and applying heat to said piece sufficient to crosslink together said piece and said silicone base member where they are in contact.

6. In combination:

a base member;

an element containing indicia; and silicone sheet material having imbedded therein a quantity of thermally activatable crosslinking catalyst;

wherein said element is sandwiched between two layers of said silicone sheet material and said two layers are crosslinked one to the other.

7. In combination:

a silicone base member;

an element containing indicia; and silicone sheet material having imbedded therein a quantity of thermally activatable crosslinking catalyst;

wherein said element is sandwiched between a layer of said silicone sheet material and said silicone base member and said layer is crosslinked to said base member.

* * * * *